United States Patent [19]

Harper et al.

[11] 4,444,696
[45] Apr. 24, 1984

[54] ULTRA-LOW-FLOWRATE LIQUID DISTRIBUTOR SYSTEM

[75] Inventors: Stephen M. Harper, Lake Jackson; Bobby G. Hawkins, Freeport, both of Tex.

[73] Assignee: The Dow Chemical Company, Midland, Mich.

[21] Appl. No.: 348,481

[22] Filed: Feb. 12, 1982

[51] Int. Cl.$^3$ .............................................. B01F 3/04
[52] U.S. Cl. ......................................... 261/97; 261/4
[58] Field of Search .................... 261/4, 97, 98, 113; 55/90, 233; 210/188; 239/556

[56] References Cited

U.S. PATENT DOCUMENTS

| | | | |
|---|---|---|---|
| 3,047,276 | 7/1962 | Sebald et al. | 261/4 X |
| 3,259,380 | 7/1966 | Brown | 261/97 |
| 3,419,251 | 12/1968 | Eckert | 261/97 X |
| 3,497,453 | 2/1970 | Yurdin | 261/97 X |
| 3,524,731 | 8/1970 | Effron et al. | 261/97 X |
| 3,556,736 | 1/1971 | Boyd | 261/97 X |
| 4,126,540 | 11/1978 | Grosboll et al. | 261/97 X |
| 4,199,537 | 4/1980 | Zardi et al. | 261/97 X |
| 4,317,787 | 3/1982 | Lagana | 261/97 X |

FOREIGN PATENT DOCUMENTS

| | | | |
|---|---|---|---|
| 442126 | 3/1927 | Fed. Rep. of Germany | 261/97 |
| 2062489 | 5/1981 | United Kingdom | 261/97 |

*Primary Examiner*—Richard L. Chiesa
*Attorney, Agent, or Firm*—M. W. Barrow

[57] ABSTRACT

Liquid distributor in packed column wherein close, long-term uniform liquid distribution pattern is desired, particularly at ultra-slow distributing flow-rates. Distributor comprised of: (1) array of spaced, enclosed, horizontal distributor tubes capable of maintaining liquid to be distributed under pressure; (2) horizontal tube lines connecting these tubes; (3) vertical pipelets of predetermined inside diameter and length inserted into bottoms of distributor tubes and extending above bottom of tubes but not to top of tubes to avoid being stopped-up by debris in the liquid; and (4) a pressurized feed means. For feeds containing both liquid and vapor phase, a parting reservoir is provided above the distributor so that the vapor phase of the feed entering the reservoir can escape the liquid phase leaving the liquid phase to flow down a conduit into the distributor tubes, said conduit being of predetermined height above the tubes so as to provide liquid under constant pressure to the distributor tubes.

8 Claims, 6 Drawing Figures

ULTRA-LOW-FLOWRATE LIQUID DISTRIBUTOR SYSTEM

BACKGROUND OF THE INVENTION

This invention relates to apparatus used in liquid vapor contact towers wherein intimate contact between gases and liquids is desired in order to exchange properties or mutually modify conditions of the gases and liquids. More particularly this apparatus relates to directing a liquid downwardly in such a tower in a very uniform distribution pattern at an ultra-slowflowrate.

In industrial processes wherein liquid and vapor are both present in a tower or column, there arises many instances wherein it is desired to add liquid to the process going on inside the tower or to allow vapor to condense to liquid as it rises in the tower and flow downwardly through rising vapor in order to achieve mass or heat transfer between the liquid and gas phases. In other instances liquid containing inhibitors are fed to the tower at predetermined elevations therein in order to prevent or inhibit some undesired event or process from occurring. An example of the purpose of feeding inhibitors is that of feeding inhibitors to prevent polymerization of the reactants and/or products in a tower or packed column. Often such ingibitors is fed with gaseous and liquid substances being re-cycled to the tower.

In any event it is most often desired to have this liquid feed as intimately dispersed in the gas or vapor as possible in order to achieve the homogeneity of the gas-liquid mixture which is required for tight control of the process proceeding in the tower.

To help achieve more uniform mixing of the vapor and liquid phases in the tower, column packing is often used therein.

Further to obtain better mixing in the column packing the liquid fed to it from above is often fed first through mechanical apparatus called distributors. These distributors attempt by various means to separate the liquid being fed downwardly into smaller, spread-apart streamlets which have a substantially uniform pattern of separation between them. It is desired to have these streamlets flow at substantially the same flowrates.

In the past much effort has been devoted to increasing the efficiency of such liquid distributors. See for example U.S. Pat. Nos. 3,446,489; 3,360,246; 3,937,769; 3,273,872; 3,143,581; 3,612,494; 3,916,021; 3,392,967; 3,259,380; 3,006,623; and British Pat. No. 1,364,649. Also see the following commercial catalogs: (1) "Tower Packing and Internals", Bulletin Number 217-Second Edition, pages 10-20, published by Glitsch, Inc. of Dallas, Texas, with copyright date of 1975 A.D.; and (2) "Packed Tower Internals", Bulletin TA-80R, pages 3.0-5.1, published by Norton Company of Akron, Ohio, with copyright date of 1976. Further art in this field is found in the presently pending patent application entitled "Liquid Distributor Apparatus and Method for a Liquid Vapor Contact Column" having U.S. Ser. No. 298,058 and U.S. Filing Date of Aug. 31, 1981, and having Stephen Mark Harper as a common inventor of its invention and the present invention.

Much of the efforts represented by much of the information and equipment disclosed in these publications are directed toward improving liquid distribution in liquid-vapor contact towers. Yet achieving and maintaining uniform liquid distribution still remains a nagging capricious problem in industrial application. Especially is this true when dealing with ultra low liquid distribution flowrates such as liquid flowrates below about 0.8-1.0 gallons per minute per square foot of tower as measured along the square footage of an imaginary horizontal planar section cutting a vertical tower just below the distributor in the tower. One of the constant problems plaguing these distributors is the plugging of their small liquid distribution outlets by debris contained in the liquid. Of course, as outlets start to plug, the flowrates from the remaining open outlets change with liquid maldistribution being the necessary consequence. Another factor contributing to liquid maldistribution is the presence of a vapor or gas phase in the liquid phase. Yet another known problem often encountered in plate-type or trough-type distributors is the imperfect horizontal alignment incurred initially or subsequently by tower shifting on its foundation.

It would be advantageous to have distributors which were much less troubled with maldistribution caused by debris in the liquid, vapor in the liquid and very low flowrates. These and other advantages are achieved by the present invention.

STATEMENT OF THE INVENTION

The present invention is a liquid distributor system in a vertical, liquid-vapor contact tower. The distributor is designed to be capable of distributing a feed which has a liquid phase which at least occasionally contains some solid debris which is of differing density than the liquid phase of the feed so that it will either float at the top of the liquid or sink to its bottom. Further the distributor system is designed so as to be capable of distributing the liquid at a flowrate of less than about 0.8 gallons per minute per square foot of tower, the square footage of the tower being measured on an imaginary horizontal planar surface in the tower located directly beneath the distributor outlets with the planar surface being bounded by the interior of the walls defining the tower.

Besides low flowrates the distributor of the present invention is also designed to be capable of having a greater than ordinarily available number of liquid distribution points per square foot of horizontal tower cross section. Customarily liquid distributors having no more than about one distributor point per twenty-five (25) square inches of horizontal tower cross-section are commercially available. Yet the need for having distributors with more distributor points per unit horizontal cross-sectional area of tower has long persisted. One of the major hindrances in going to such greater number has been the plugging problems of the distribution points by debris when doing so. For when going to a greater number of distribution points per unit area at a given flowrate, the smaller must be the size of the openings in these distribution points for a given flowrate. And, of course, the smaller the size of these openings, then the more susceptible they are to fouling and plugging by the solid debris; and the more plugging there is, the more maldistribution of the liquid there is. This increased maldistribution, of course, defeats the purpose of increasing the number of distribution points per tower horizontal planar unit area.

The present distributor provides a means for achieving greater numbers of distribution points per unit area while substantially avoiding the increased susceptibility to plugging of these distribution points discussed above. It does this simply by employing distribution points in the distributor by which liquid is withdrawn from the distributor at points where there is virtually no debris. That is, the inlets to these distributor points are located not at the top of the liquid level in the distributor where lighter debris floats, nor are they at the bottom of this liquid level where the heavier-than-liquid debris settles. Rather these inlets are located at some point between the top and bottom of this liquid level where there is virtually no such debris.

By having the inlets of the distribution points so located in the liquid in the distributor, the distributor of the present invention is able to achieve a much greater concentration of distributor points than ordinarily attainable without the occurrence of distributor point plugging and liquid maldistribution heretofore encountered when trying to achieve this greater distributor point concentration. With the present invention the distributor point concentration can be increased so that there is at least one distribution point per each twenty (20) square inches of tower cross-section. Tower cross-section is defined herein to mean the imaginary horizontal planar section located in the tower directly beneath the distributor and whose outer boundaries are the inner boundaries of the tower walls. Further, distributor point concentration with this invention can easily be increased so that there is at least one distribution point per fifteen (15) square inches of tower cross-section, and even to concentrations of at least one distributor point per ten (10) square inches of tower cross section without any appreciable plugging.

Moreover, this greater concentration of distribution points can be achieved at very slow liquid flowrates. For example, liquids have been uniformly distributed with flowrates less than 0.8 gallons per minute per square foot of tower cross section (gpm/ft.$^2$), and even less than 0.5 gpm/ft.$^2$, and even less than 0.2 gpm/ft.$^2$ with a uniform distribution pattern for long periods of time. Moreover these liquids can be so uniformly distributed for long periods of time at these very low flowrates in combination with the higher concentrations of (and necessarily smaller sized) distribution points discussed above.

The distributor present invention is comprised of: (1) an array of substantially horizontal, spaced distributor tubes; (2) transfer lines to maintain these tubes in fluid communication with one another; (3) a pressurized liquid feed means to feed liquid to the array of tubes at a pressure greater than the tower pressure outside the array of tubes; and (4) a plurality of substantially vertical, spaced, hollow pipelets inserted into and extending downwardly from the individual tubes of the array of tubes.

The tubes of the array of tubes are hollow and are enclosed except for the openings in them to provide connecting points for the transfer lines, the liquid feed means, and the pipelets so that the liquid inside the tubes can be maintained at a higher pressure than the environment immediately external to the tube array, and preferably at a constant higher pressure.

The liquid feed means is one capable of delivering liquid feed to the array of tubes at a constant flowrate and a constant pressure.

The hollow pipelets are vertically oriented and are sealably fitted into the bottoms of the horizontal tubes of the tube array. The hollow pipelets serve as the distribution points discussed above. They extend far enough into the tubes to avoid having their inlet openings be in the lower layer of the liquid where the heavier-than-liquid debris settles, but yet they do not extend into the tubes that their opening inlet lies in the upper part of the liquid in the tubes where the lighter-than-liquid debris floats.

The size of the hollow pipelets are the same; that is, their lengths are the same and their inside diameter is the same inasmuch as the flowrates of liquid through each of these pipelets is desired to be the same in each pipelet and inasmuch as such flowrates are proportional to their tube interior cross-sectional area and inversely proportional to their tube length. This sizing, of course, is determined by the total flowrate desired to come from the total number of these pipelets; and the total number of pipelets is proportional to the size of the tower and the concentration of pipelets per square foot of tower horizontal cross section. And, of course, since a uniform distribution pattern is desired from the outlets of these pipelets, the number of pipelets along one tube is limited by the distance from one tube to the adjacent tubes whose pipelets must form a uniform pattern with the pipelets of the whole array of tubes. One further consideration to be considered in determining flowrate is the pressure drop incurred by the liquid flowing through these pipelets. Thus, the spacing of the tubes and pipelets, the number of the pipelets, the sizing of the holes in the hollow pipelets, the length of the hollow pipelets, and the expected pressure drop of liquid flowing through the pipelets must all be coordinated in order to obtain a given flowrate from a distributor of this invention.

The central idea remains, however, and that is to maintain sufficient pressure drop across the pipelets so that the tubes remain full of liquid in order that the opening inlets of the pipelets inside the tubes remains submerged about midstream in the liquid, but not submerged at the bottom of the tubes where plugging of the narrow hollow pipelets tends to occur. With this concern of plugging so greatly reduced, the hollow pipelets can thus be greatly reduced in interior opening size thus allowing less flow per pipelet without plugging and thus allowing more pipelets which in turn allows more uniformity in the distribution of the liquid.

A further combination of parts makes the above discussed invention even more versatile. If a sufficiently large, open-topped reservoir container is added to the above system, at a predetermined height above the array of tubes, the liquid feed can be now fed to the reservoir instead of directly to the tube array, and if the reservoir container is connected to and in fluid communication with the array of tubes by a conduit means descending from the reservoir container to the array of tubes, then the liquid distributor system becomes a multi-phase, ultra-low-flowrate liquid distributor capable of uniformly distributing the liquid phase of a feed comprised of a liquid phase and a vapor phase at an ultra-low-flowrate into the tower in a simplified manner. Industry has long needed such a system.

The invention will be better understood by reference to the drawing wherein like parts have the same reference number.

DETAILED DESCRIPTION OF THE PREFERRED EMBODIMENTS OF THE INVENTION

Figure 5:
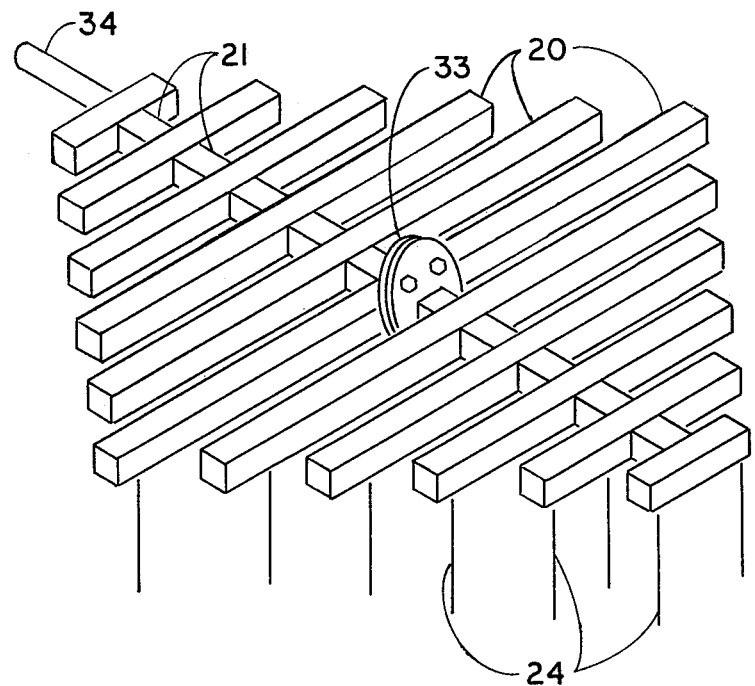
FIG. 5 is an isometric view of an ultra-low-flowrate, pressurized liquid distributor system which differs primarily from the multi-phase, ultra-low-flowrate liquid distributor system of FIGS. 1–4 in that it does not employ a reservoir to separate the liquid phase from a gas phase of a multi-phase feed to the distributor.

The figures of the drawing illustrate two preferred embodiments of the ultra-low-flowrate liquid distributor systems of the present invention. The embodiment capable of handling a feed which is comprised of both a vapor phase and a liquid phase is illustrated in FIGS. 1–4 and FIG. 6. The embodiment which need not handle a vapor phase in its feed is depicted in FIG. 5. Of course, many features of this second embodiment are depicted in the Figures depicting the first embodiment as both embodiments have many features in common.

Figure 1:
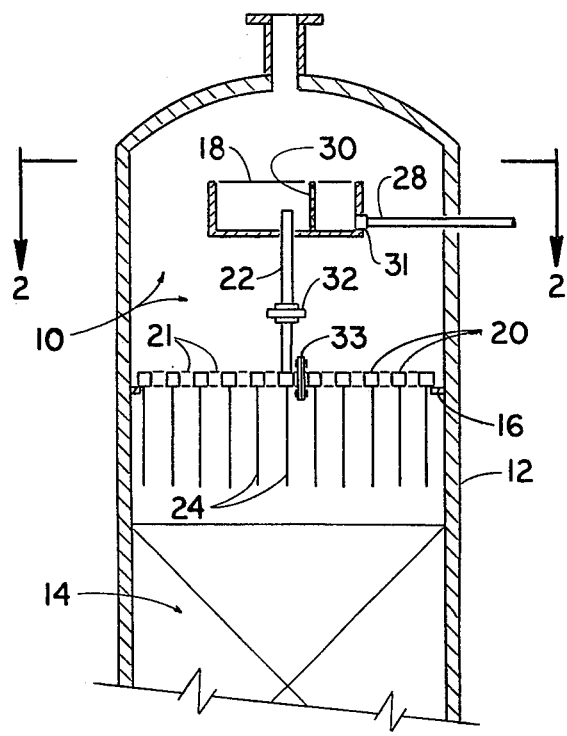
FIG. 1 is an elevation in a section of a tower containing an embodiment of a multi-phase, ultralow-flowrate liquid distributor system of the present invention in place.
Figure 2:
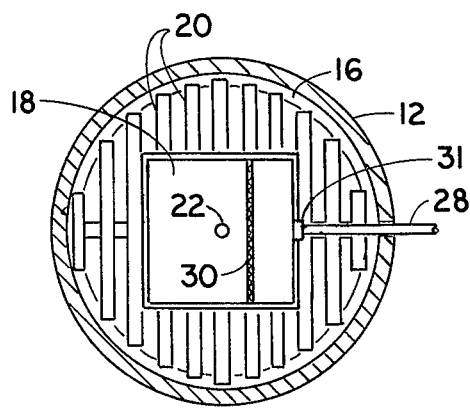
FIG. 2 is a top view of the distributor system in the tower of FIG. 1 as seen along cutting place 2—2 in FIG. 1.
Figure 3:
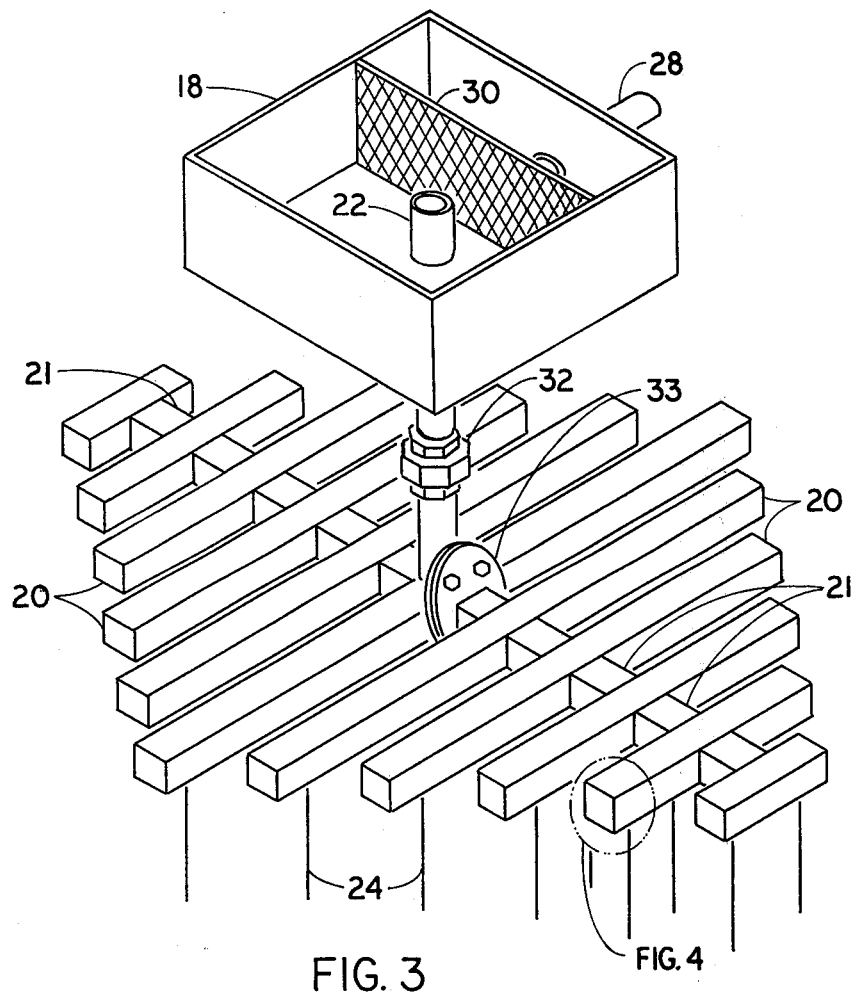
FIG. 3 is an isometric view of the multi-phase, ultra-low-flowrate liquid distributor system of FIGS. 1 and 2.
Figure 4:
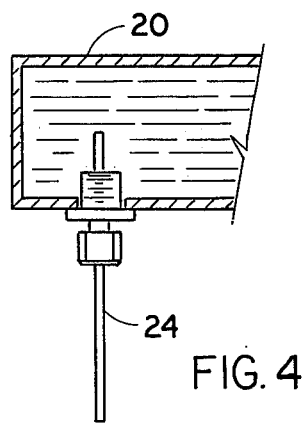
FIG. 4 is an enlarged, fragmentary, side view of one of the tubes with one of its hollow pipelets of the tube array indicated by the encircled section labelled FIG. 4 in FIG. 3.

Referring to FIG. 1, the multi-phase, ultra-low-flowrate liquid distributor system 10 can be seen installed in a typical tower 12 which contains a column packing bed 14 in which liquid from the distributor 10 is ultimately mixed with vapor rising in tower 12 from beneath bed 14. Liquid distributor system 10 is supported in tower 12 by support lip 16 which is welded around and to the internal periphery of the vertical, cylindrical-shaped side-wall of tower 12.

Distributor system 10 as shown in FIGS. 1, 2, 3, 4, and 6 is seen to have a reservoir container 18, an array of distributor tubes 20, a conduit 22 forming a liquid communication link between and connecting the distributor tube array 20 and reservoir container 18, and liquid distribution hollow pipelets 24 extending downwardly from distribution tube array 20. Transfer lines 21 physically connect distribution tubes 20 and form liquid communication and pressure transfer links between tubes 20.

Reservoir container 18 is designed sufficiently large enough to hold liquid and gas mixtures fed to reservoir 18 through pipe 28 in a substantially quiescent condition. This is done to allow the gas phase to separate from the liquid phase of the feed and pass out the open top of reservoir 18 into the interior of tower 12.

Reservoir container 18 has two features which permit it to prevent solid debris in the incoming feed from traveling down conduit 22 into distributor tubes 20 and plugging hollow distributor pipelets 24. The first of these features in screen 30 through which the feed from pipe 28 must pass before it can reach the top opening of conduit 22. The second debris removing feature is the combination of having the top opening of conduit 22 sufficiently far enough above the bottom of reservoir container 18 so that heavier-than-liquid debris has had time to settle from the liquid to the bottom of container 18 before the liquid flows into the raised upper opening of conduit 22.

To allow easier installation of reservoir 18 through a tower manway, pipe 28 has a disconnect coupling 31 in it near the side of reservoir 18 and conduit 22 has a disconnect coupling 32 in it between the bottom of reservoir container 18 and the top of tube array 20. Likewise the array of distributor tubes 20 has a disconnect flange 33 in it to allow the array to be separated into two different sections to provide for easier installation in towers such as when the assembly has to be transferred into the tower through manways.

Conduit 22 is fixed at a certain height above distributor tubes 20 so that it can provide a constant liquid head pressure of considerable magnitude to the liquid in tubes 20. In this manner slight variations in height of the tubes 20 from one to another does not have the tremendously large effect upon flow distribution from the distributor as does such variations have in conventional plate-type distributors and trough-type distributors. (See U.S. Pat. No. 3,446,489 for an example of a plate-type distributor; and see U.S. Pat. Nos. 3,392,967 and 3,937,769 for examples of trough-type distributors.)

The array of distributor tubes 20 is formed from a plurality of closely spaced, horizontally oriented, parallel, enclosed tubes which are connected together by transfer lines 21 in such a fashion so that they are all substantially the same height in tower 12. Thus the pressure of the liquid inside each tube 20 is virtually the same as the liquid head pressure at the bottom of conduit 22 when transfer lines 21 and tubes 20 are sufficiently large enough so that liquid flowing through them undergoes no appreciable pressure drop when compared to the constant pressure head provided by the liquid in conduit 22.

A plurality of hollow, vertical, spaced pipelets 24 are screwed into the bottom of tubes 20. The tops of pipelets 24 are extended upward into tubes 20 to about midway between the top and bottom of tubes 20 so that any debris remaining in the liquid does not enter pipelets 24 and clog them because virtually all of such debris is either floating near the top of tubes 20 or is resting on their bottoms away from midstream of the liquid in tubes 20. The number of pipelets 24, their inner diameter size and their length are coordinated with the spacing of the tubes and the height of conduit 22 to achieve the flowrate desired to come from the distributor.

An alternative embodiment of this distributor is shown in FIG. 5. It is designed for the situation where no gas is present in the feed and where a constant pressure is applied to the liquid feed in tubes 20 by a means other than the liquid pressure head provided by the liquid level in conduit 22 of the first described embodiment above. This alternative embodiment can be fed at any point entering the array of tubes 20. Here horizontal feed pipe coupling 34 is provided Referring to FIG. 6, a square uniform distribution of pipelets 24 is illustrated by segmented phantom lines 40 connecting pipelets 24.

EXAMPLE

A liquid distributor system like that shown in FIGS. 1, 2, 3, 4 and 6 was installed in a 24-inch diameter packed column like tower 12 shown in FIG. 1. The parallel distributor tubes 20 each had a square vertical cross-section which measured 1 inch by 1 inch. There were a total of 7 tubes used and were spaced 4 inches apart. Conduit 22 was ½ inch in diameter and was 12 inches in total length. Reservoir container 18 measured 12 inches long by 12 inches wide by 4 inches tall. Its top was open. Conduit 22 emerged through the bottom of reservoir 18 a distance of about ½ inch above the bottom of reservoir 18.

Pipelets 24 extended from the bottom of distribution tubes 20. They extended into tubes 20 a distance of about ½ inch. Each of these pipelets were 8 inches long and had an inside diameter of 0.055 inches. Pipelets 24 were purchased commercially.

Figure 6:
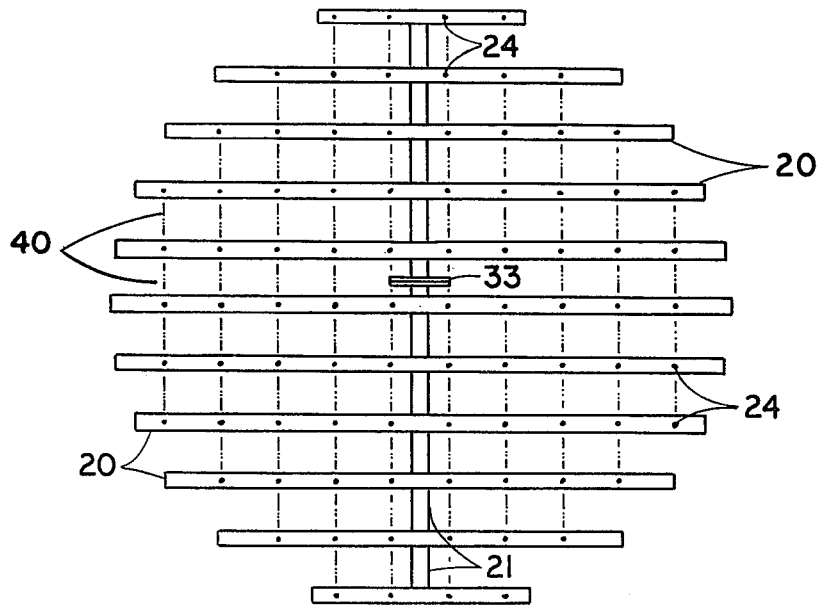
FIG. 6 is a bottom view of both of the distributor systems of FIGS. 1–5 showing a uniform distribution pattern for the pipelets coming from the bottom of the array of tubes.

Forty-nine (49) pipelets were used and were spaced in the same distribution pattern as shown in FIG. 6. This is a 4-inch by 4-inch square pattern. The concentration of pipelets was such that there was about one pipelet per 10 square inches of imaginary tower planar section. Feed was fed to reservoir 18 through pipe 28 at a flowrate of 0.80 gallons per minute for a period of about 8 months.

The feed was comprised of a liquid phase and a gaseous phase in a proportion of about 10 volume percent gaseous phase to about 90 volume percent liquid phase. The gas of the gaseous phase was primarily acrolein, formaldehyde and inerts. The liquid of the liquid phase was primarily $H_2O$, acrylic acid and acetic acid. The feed also contained an inhibitor which occasionally would react with an impurity and produce a solid debris which accumulated on the bottom of the reservoir container 18 and on screen 30. The flowrate from the bottom of the pipelets 24 into the column packing 14 was only 0.25 gallons per minute per square foot of tower cross-section. The flowrate from the individual pipelets 24 was 0.016 gallons per minute. The tower was run on one occasion for over five months without plugging any of the pipelets 24. Two of the forty-nine pipelets were partially plugged after a period of about three months.

Having described the invention, accordingly we claim:

1. A liquid distributor system in a vertical liquid-vapor contact tower wherein feed to the liquid distributor contains a liquid phase, and at least some occasional solid debris being of a different density than the liquid, and wherein the liquid to be distributed by the distributor is required to be distributed in a substantially uniform pattern across an imaginary horizontal plane located immediately beneath the distributor at a very low flowrate of less than 0.8 gallons per minute per square foot of said horizontal plane, which distributor system is comprised of: an array of substantially horizontal, spaced distributor tubes; transfer lines to maintain said tubes in fluid communication with one another; a liquid feed means to feed pressurized liquid to the array of distributor tubes; and a plurality of substantially vertical, spaced hollow pipelets inserted through the bottoms of said array of distributor tubes;

said array of tubes being enclosed hollow tubes except for the openings provided in said tubes for said pipelets, said connecting transfer lines, and said pressurized liquid feed means, said pipelets, transfer lines, and feed means being sealably connected into said openings in a fashion such that all flow of liquid into said array of tubes is through the feed means and such that the flow of liquid out of said array of tubes is through said pipelets, and the flow of liquid between tubes in the array of tubes is through the transfer lines so that a substantially uniform pressure can be maintained in the liquid feed throughout the interior of said tubes with said pressure being greater than the pressure in the tower immediately outside the tube array, said array of tubes being in fluid communication with each other through said feed and pressure transfer lines which connect the tubes into a connected array;

said pressurized liquid feed means being connected to the array of tubes in a manner so that it can feed a liquid to be distributed into the array of tubes at a substantially constant flowrate and at a substantially constant pressure which is greater than the pressure immediately outside and around said array of tubes;

said plurality of substantially vertical, spaced, hollow pipelets being sealably fitted into the bottoms of the horizontal tubes of the array and pipelets and extending into said tubes sufficiently to avoid being plugged by heavier debris washing along the bottom of the tubes but not extending close enough to the top of said tubes to be plugged by debris floating in the top of liquid in the tubes, which liquid is to be uniformly distributed from the array of tubes by flowing downwardly from the tubes through and out of said hollow pipelets into the tower;

the size of the openings through the hollow pipelets, the length of the pipelets, the size of the tubes and conduits all being coordinated in size with respect to the desired flowrate of the liquid to be distributed and so located so that a liquid fed into the distributor will emerge from the bottom ends of the pipelets at the desired slow flowrate in the tower while maintaining a positive pressure differential in the liquid in the tubes with respect to the environment immediately outside the tubes in order to minimize effects of non-levelness of the distributor's liquid outlets, the bottoms of said pipelets being so spaced from one another as to produce at least a substantially uniform pattern of liquid distribution in the tower across an imaginary horizontal planar section of the tower located directly beneath the pipelets' lower ends in the tower.

2. The distributor of claim 1 wherein there are sufficient vertical, spaced, hollow pipelets so that there is a pipelet distribution of at least one pipelet per each 20 square inches of the imaginary horizontal planar section of the tower.

3. The distributor of claim 2 wherein there are sufficient pipelets so there is an average of one pipelet or more per each 15 square inches of imaginary horizontal plane.

4. The distributor of claim 2 wherein there are sufficient pipelets so that there is a pipelet distribution as high as at least one pipelet per each 10 square inches of the imaginary planar section.

5. A multi-phase ultra-low-flowrate liquid distributor system in a vertical liquid-vapor contact tower wherein feed to the liquid distributor contains a liquid phase, a vapor phase and at least some occasional solid debris being of a different density than the liquid, and wherein the liquid to be distributed by the distributor is required to be distributed in a uniform pattern across an imaginary horizontal plane located immediately beneath the distributor at a very low flowrate of less than 0.8 gallons per minute per square foot of said horizontal plane, which distributor system is comprised of an array of distributor tubes, a reservoir container, and a conduit means which forms a fluid communication link between the array of distributor tubes and the reservoir container, said reservoir container being located in the tower at a predetermined height above said array of distributor tubes so that a constant liquid head pressure due to this fixed height is maintained throughout the distributor tubes, said reservoir container being sufficiently large to form a quiescent zone so that as the liquid-vapor feed is fed to the distributor system via this reservoir container this two-phase feed can be sufficiently quiescent for a time sufficient to allow a major portion of the vapor phase to separate from the liquid phase of the feed and escape from the liquid through an opening provided in the top of the reservoir container so as to leave the liquid as that part of the feed left to flow down the conduit means from the reservoir into the array of distributor tubes;

said array of distributor tubes being comprised of a plurality of spaced tubes, feed and pressure transfer lines connecting said spaced tubes, and a plurality of spaced hollow pipelets extending downwardly from the interior of the spaced tubes to provide distribution outlets for the liquid to pass from the spaced tubes into the tower interior, said spaced tubes being enclosed except for openings therein provided for said conduit means, said transfer lines and said hollow pipelets to be sealably connected thereto;

said spaced tubes being substantially horizontally oriented in the tower and located at substantially the same height therein with the bottom ends of said pipelets being spaced from one another in such a fashion so that the liquid phase of the feed will seep from them in a fashion such as to form a substantially uniformly distributed pattern across an imaginary, horizontally oriented, planar cross-section of the tower located immediately beneath the bottom ends of said pipelets;

said vertical pipelets extending into said tubes sufficiently far enough so that their upper ends are sufficiently far enough away from the bottoms and tops of their respective tubes so that any solid debris either floating at the top of the liquid phase or accumulating at its bottom does not readily enter and plug the pipelets and thereby upsetting the distribution pattern of the liquid emerging from the bottom ends of said pipelets;

based on the flowrate and physical properties of the liquid desired to be distributed, the cross-sectional areas of said spaced tubes and said conduit means being sized sufficiently large so that there is no significant pressure drop occurring within said tubes when feed is fed to the distributor system at its intended flowrate with the number, length and interior diameter of said pipelets being sized in conjunction with the intended flowrate and viscosity of the liquid phase of the feed to be distributed as well as the cross-sectional area of the tubes and conduit means and the pressure of the liquid in the tubes so that a substantially uniform liquid distribution pattern from the pipelet bottom ends is capable of being maintained.

6. The multi-phase, ultra-low-flowrate, liquid distributor of claim 5 wherein there are a sufficient number of spaced, vertically oriented, hollow pipelets so that there is a pipelet distribution of at least one pipelet per each 20 square inches of the horizontal imaginary planar section of said tower.

7. The liquid distributor systems of claim 6 wherein there are a sufficient large number of pipelets extending downwardly from the tubes so that there is a pipelet distribution of at least one pipelet per each 15 square inches of the imaginary planar section.

8. The liquid distributor system of claim 6 wherein there are a sufficient number of vertical pipelets to provide a pipelet distribution of at least one pipelet per 10 square inches across the imaginary horizontal planar section of the tower.

* * * * *

UNITED STATES PATENT AND TRADEMARK OFFICE
CERTIFICATE OF CORRECTION

PATENT NO. : 4,444,696
DATED : April 24, 1984
INVENTOR(S) : Stephen M. Harper; Bobby G. Hawkins It is certified that error appears in the above—identified patent and that said Letters Patent is hereby corrected as shown below:

Col. 1, Line 26, change "ingibitors" to --inhibitors--.

Col. 5, Line 37, change "ultimately" to --intimately--.

Signed and Sealed this

Thirteenth Day of November 1984

[SEAL]

Attest:

GERALD J. MOSSINGHOFF

*Attesting Officer*  *Commissioner of Patents and Trademarks*